United States Patent [19]

Nadkarni et al.

[11] Patent Number: 4,825,375
[45] Date of Patent: Apr. 25, 1989

[54] APPARATUS AND METHODS FOR APPORTIONING COMMANDS BETWEEN AIRCRAFT FLIGHT CONTROL SURFACES

[75] Inventors: Arun A. Nadkarni; Thomas M. Richardson, both of King County, Wash.

[73] Assignee: Boeing Company, Seattle, Wash.

[21] Appl. No.: 812,938

[22] Filed: Dec. 23, 1985

[51] Int. Cl.⁴ .................. G06F 15/50; B64C 13/00
[52] U.S. Cl. ............................ 364/435; 244/178; 244/181; 318/584
[58] Field of Search ............... 364/433, 434, 435; 244/178, 179, 181, 191, 193, 192; 318/566, 584; 73/178 R

[56] References Cited

U.S. PATENT DOCUMENTS

| | | | |
|---|---|---|---|
| 2,568,718 | 9/1951 | Curry | 33/24 R |
| 2,949,259 | 8/1960 | Bell | 318/566 |
| 3,058,700 | 10/1962 | Hecht | 244/179 |
| 3,137,459 | 6/1964 | Smith | 244/192 |
| 3,215,374 | 11/1965 | Olshausen | 244/191 |
| 3,236,478 | 2/1966 | Adams | 318/566 |
| 3,240,447 | 3/1966 | Olshausen | 244/191 |
| 3,369,161 | 2/1968 | Kaufman | 318/566 |
| 3,378,217 | 4/1968 | Diani | 244/178 |
| 3,578,268 | 1/1969 | Kramer | 364/434 |
| 3,734,432 | 5/1973 | Low | 244/191 |
| 3,841,589 | 10/1984 | Appleby et al. | 244/178 |
| 3,848,833 | 11/1974 | Rauschelbach | 364/434 |
| 3,921,941 | 11/1975 | Lehfeldt | 244/178 |
| 4,017,045 | 4/1977 | Kirchhein | 244/178 |
| 4,032,093 | 6/1977 | Bonne et al. | 244/180 |
| 4,382,282 | 5/1983 | Graham et al. | 364/434 |

*Primary Examiner*—Parshotam S. Lall
*Assistant Examiner*—Thomas G. Black
*Attorney, Agent, or Firm*—Bernard A. Donahue

[57] ABSTRACT

A controller for apportioning high amplitude and low amplitude control signals between two aircraft control surfaces, such as for example, between an elevator and an associated movable horizontal stabilizer. The signals are separated along a first path and a second path. Signals along the first path are fed to a low pass filter where the low frequency signals are separated and an elevator position error signal is generated. Those signals exceeding a predetermined elevator position error are fed in the form of stabilizer rate signals to a stabilizer position module where a stabilizer positioning signal is generated and then fed to a stabilizer servo system to reposition the horizontal stabilizer. The stabilizer positioning signal is also fed to a multiplier where it is multiplied by a predetermined pitch effectiveness ratio representing the amount of elevator deflection required to achieve the same pitch moment as one degree of stabilizer deflection. The resulting multiplied signal is subtracted from control signals along the second path to generate an elevator positioning signal which is fed to an elevator servo system to reposition the elevator.

16 Claims, 7 Drawing Sheets

APPARATUS AND METHODS FOR APPORTIONING COMMANDS BETWEEN AIRCRAFT FLIGHT CONTROL SURFACES

TECHNICAL FIELD

The present invention relates to an aircraft system for controlling the deflection of aircraft flight control surfaces, and more particularly to a controller for apportioning aircraft pitch control commands between a smaller, faster moving flight control surface such as an elevator, and a larger, slower moving flight control surface, such as a movable horizontal stabilizer.

BACKGROUND OF THE INVENTION

Movement of an aircraft primary flight control surface such as an aileron, elevator or rudder, requires the application of a control moment or torque to the control surface both to deflect the control surface and to maintain it at the newly deflected position. In some aircraft, the control surface may be connected to a fixed airfoil such as a vertical or horizontal stabilizer, and may typically include smaller movable trim tabs. The trim tabs may be deflected to counteract the torque required to maintain the control surface at its new position thereby reducing the force required to be applied by the pilot or autopilot.

Some aircraft may have a movable horizontal stabilizer which has a much larger surface area than the corresponding elevator, and as a consequence generates much larger pitching moments when responding to pitch control commands. When the aircraft is in a flight condition requiring sustained elevator deflection to maintain that condition, e.g. landing approach, the horizontal stabilizer may be repositioned. Repositioning of the horizontal stabilizer allows the control force applied to the elevator to be reduced. In addition, the elevator may be centered about a new pitch axis relative to the horizontal stabilizer, to allow the elevator a maximum amount of deflection both above and below the new pitch axis when responding to pitch command signals.

Various systems for controlling aircraft flight control surfaces and trim tab surfaces have been disclosed. In some aircraft flight control systems the elevator is used to make all pitch command changes and then the horizontal stabilizer is used to trim the elevator control back to neutral. For example, in U.S. Pat. No. 4,382,282—by Graham, there is disclosed an automatic trim system for a stabilizer wherein when established threshold limits for the deflection of the elevator relative to the stabilizer have been reached, a trim motor is automatically actuated to move the horizontal stabilizer so that the angular deflection between the stabilizer and the elevator is reduced in order to reduce aerodynamic drag.

In Lehfeldt U.S. Pat. No. 3,921,941, there is disclosed an apparatus for adjusting flight parameters such as aircraft airspeed and altitude while the aircraft is under control of an autopilot.

A control system for reducing airfoil flutter is disclosed in U.S. Pat. No. 3,734,432—by Low, wherein leading edge and trailing edge control surfaces are deflected in accordance with a predetermined control law to counteract bending and torsional motion of the airfoil.

Kaufman, U.S. Pat. No. 3,369,161 discloses an apparatus for preventing a hardover maneuver in an aircraft by mechanically limiting the range and velocity of operation of a servomotor which positions the control surfaces of the aircraft.

U.S. Pat. No. 3,236,478—by Adams, et al, discloses a flight control system employing normal accelerometer feedback signals for reducing aircraft response to gusts and including signal cancellation means for generating a signal which cancels the portion of the sensed acceleration to which a gust alleviator responds.

In patents by Olhausen, U.S. Pat. Nos. 3,215,374 and 3,240,447, there are disclosed control systems for an aircraft having a canard configuration wherein a compensating change in lift is effected without a change in aircraft pitch moment by generation of a pitching moment in the canard control surface which balances the pitching moment of a primary control surface of the aircraft.

Smith, U.S. Pat. No. 3,137,459, discloses a servo closed loop control system for stabilizing the operation of an autopilot for a missile wherein the actual inflight performance of the missile is compared with preselected reference signals to generate an error signal which is further processed to generate a command signal to the missile's flight controls.

An aircraft autopilot system is disclosed in Bond, U.S. Pat. No. 3,094,299, the autopilot system including pitch control function wherein elevons are operated at or near the center position by incorporation of a trimming unit which achieves deflection of a trimming surface at a rate proportional to the average displacement of the flight control surfaces, and whereby actual trimmer displacement is proportional to the integral of the flight control surface displacement.

An aircraft flight control system is also disclosed in Hecht, U.S. Pat. No. 3,058,700 wherein a signal output to a flight control yaw channel is damped in proportion to the magnitude of that signal thereby preventing excessive loading on the aircraft rudder.

U.S. Pat. No. 2,949,259—by Bell, discloses a system for regulating a flight control surface repositioning servo motor wherein the position of a control surface trim tab is used as an indication of the aircraft's center of gravity in order to regulate the torque developed by the servomotor.

In Curry, U.S. Pat. No. 2,568,719, an aircraft control system is disclosed wherein a common signal is utilized to both control a main motor operating a flight control surface in order to correct for short term transient errors, and to operate a trim motor connected to trim tab attached to a corresponding flight control surface to correct for any sustained or long period errors in the position of the flight control surface.

SUMMARY OF THE INVENTION

The present invention processes incoming aircraft control signals of various amplitudes and apportions these signals so that (1) lower amplitude signals are directed to reposition a smaller, faster acting flight control surface such as an elevator, and (2) lower frequency, larger amplitude signals are directed to control movement of a larger, slower acting flight control surface such as a movable horizontal stabilizer.

Incoming elevator control signals are directed to a signal amplitude limiter, as well as to an elevator servo. The signal amplitude limiter passes only those control signals within a predetermined amplitude through to a second order low pass filter. At the low pass filter, high frequency components of the control signals are rejected. A calculated equivalent elevator position signal is subtracted from the remaining lower frequency components to generate an elevator position error signal. When the elevator position error signal exceeds a predetermined level, it is converted to a stabilizer rate signal. The stabilizer rate signal is integrated to generate a stabilizer position command signal which is fed both to a horizontal stabilizer servomotor to reposition the horizontal stabilizer, as well as to a horizontal stabilizer-to-elevator pitch effectiveness ratio multiplier where a predetermined ratio value is stored. The pitch effectiveness ratio represents the amount of deflection required by the elevator to generate a pitch moment equivalent to that pitch moment generated by deflection of the horizontal stabilizer a predetermined amount.

By multiplying the stabilizer position command signal by the pitch effectiveness ratio, an equivalent elevator signal is obtained which represents an amount of elevator deflection which is equivalent to the commanded deflection of the horizontal stabilizer. This equivalent elevator signal is then subtracted from incoming control signals to the elevator to generate an elevator control signal which is input to the elevator servo for deflecting the elevator. Thus, by reducing the elevator control signal to offset the increased pitch moment resulting from deflection of the horizontal stabilizer, the commanded pitch attitude of the aircraft is attained.

It is therefore a general object of the present invention to provide a controller for apportioning control signals between aircraft flight control airfoils, typically between an elevator and a movable horizontal stabilizer.

BRIEF DESCRIPTION OF THE DRAWINGS

These and other objects and advantages of the present invention will become more readily apparent upon reading the following detailed description and upon reference to the attached drawings in which:

FIGS. 6A through 6C are graphical representations of changes in aircraft operating parameters caused by a change in aircraft pitch without incorporation of the apportioning controller of the present invention, and further wherein

While the present invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention.

DETAILED DESCRIPTION

The present invention comprises a control system for apportioning ("off-loading") control signals between two airfoil members to control the flight path of an aircraft. In an exemplary embodiment, the present invention will be described with reference to pitch command signals which are apportioned between a movable horizontal stabilizer and its associated elevator. It should be appreciated however, that the present control system is applicable to apportioning command signals between any two or more related airfoil members of an aircraft which are moved to control the flight path of the aircraft.

Figures 1, 2:
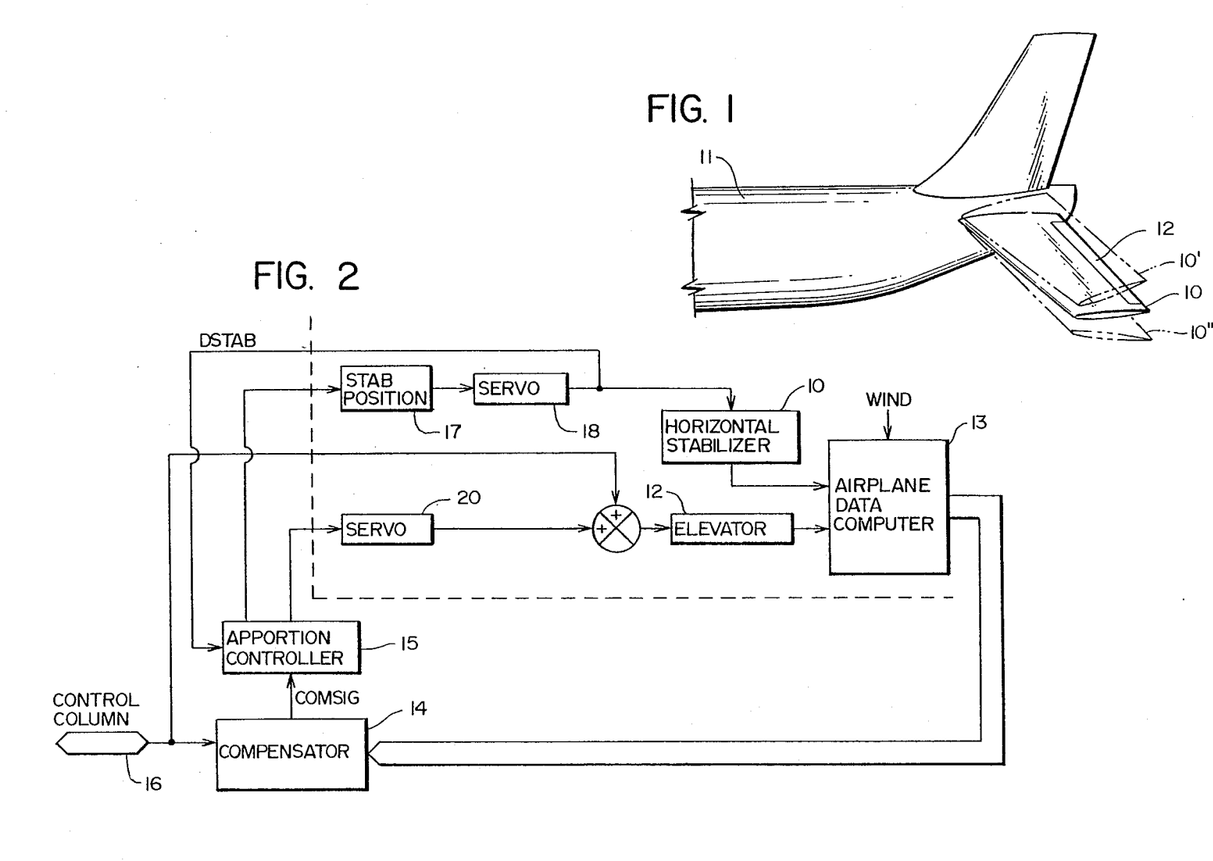
FIG. 1 is a pictorial representation of an exemplary embodiment of the present invention wherein pitch control signals are apportioned between an elevator and a movable horizontal stabilizer.
FIG. 2 is a block diagram of an aircraft flight control system including the signal apportioning controller of the present invention.

A conventional aircraft is shown in FIG. 1 having a rearwardly located horizontal stabilizer 10 which is movably connected to aircraft 11 for upward deflection as shown in phantom as 10', and downward deflection shown in phantom as 10". Movably connected to the trailing edge of horizontal stabilizer 10 is an elevator 12 having a smaller effective surface area than horizontal stabilizer 10 and movable in an upward and downward direction relative to stabilizer 10 in response to command signals. In the present application, the amount of deflection of horizontal stabilizer 10 is defined relative to a selected longitudinal reference plane of aircraft 11, whereas the amount of deflection of elevator 12 is defined relative to a selected chordwise reference plane of horizontal stabilizer 10.

During aircraft flight, pitch control commands are generated by an aircraft air data computer in response to various input parameters which affect the projected flight path of the aircraft. To provide a clearer understanding of the pitch command signals, an exemplary flight condition is described in which an aircraft is decelerating from a higher airspeed to a lower airspeed at a constant altitude and in which no apportioning of control signals between the elevator and the horizontal stabilizer occurs. During this deceleration, the pitch attitude of the aircraft is slowly increased by an upward deflection of the elevator. During an initial portion of the deceleration, a relatively small upward deflection of the elevator is required. However, as the aircraft airspeed continues to decrease, additional upward deflection of the aircraft elevator is required to increase the pitch attitude of the aircraft to maintain aircraft altitude. The aircraft may encounter turbulence which imparts forces to the aircraft which tend to change aircraft altitude. An aircraft automatic flight control system responds to this turbulence by deflecting the elevator to change the aircraft pitch in opposition to the direction of the turbulent forces. Therefore in response to a downdraft, a further upward movement of the aircraft elevator from its previously deflected position is required. A sufficient range of elevator deflection is necessary so that the aircraft has the ability to respond to those additional requirements for upward or downward pitch while maintaining the previously commanded pitch attitude of the aircraft. Where a change in aircraft attitude is accomplished entirely by a change in elevator position, the elevator may not have a sufficient remaining range of deflection to respond to additional pitch attitude commands.

The pitch control commands generated during the aforementioned deceleration, include a mixture of (i) low frequency, low amplitude signals which are generated during initial deceleration to cause the aircraft to begin to pitch up, (ii) low frequency, large amplitude control signals which are generated during later portions of the deceleration to cause the aircraft pitch attitude to further increase, and (iii) high frequency, low amplitude signals which are generated by the automatic flight control system in response to the turbulence encountered during the deceleration. During the aforementioned deceleration, low frequency, very high amplitude signals may be generated in the event large movements of the flight control airfoils are necessary, such as, for example, in an emergency situation.

It is desirable however, that the larger changes in pitch attitude be accomplished by repositioning of the larger horizontal stabilizer, whereas the smaller, more transient changes be accomplished by changes in the position of the elevator. For example in FIG. 1, when small updrafts or downdrafts are encountered, it is preferable that elevator 12 of aircraft 11 deflect to counteract the transient flight conditions. Elevators are relatively small and therefore are movable by relatively fast acting, low torque hydraulic motors. On the other hand, where a large change in pitch attitude is commanded, it is preferable that the larger horizontal stabilizer 10 be deflected to provide the necessary pitch moment to place the aircraft in the selected pitch attitude. The horizontal stabilizer 10 is subject to higher aerodynamic forces when deflected, and therefore is repositionable by a slower acting mechanical apparatus, such as a jack screw, which develops the necessary torque to move the horizontal stabilizer against the large aerodynamic forces resisting repositioning. It is desirable therefore to apportion the mixture of incoming pitch control signals so that the smaller signals control elevator repositioning, whereas the larger signals control horizontal stabilizer repositioning. This apportionment reduces the amount of deflection of the elevator thereby (i) reducing mechanical wear to the elevator actuating assemblies, and (ii) reducing the adverse consequences of an erroneous "hardover" command to the fast acting elevator surface by apportioning the larger control signals to the slower responding horizontal stabilizer. Thus, the pilot is provided with more time to respond to the hardover command.

Referring to FIG. 2, there is shown a simplified block diagram of an aircraft flight control system including conventional control system components utilized currently on Boeing 757 aircraft, as well as a controller for apportioning pitch command signals in accordance with the present invention. Conventionally, aircraft flight operating parameters such as airspeed, altitude, current positions of the elevator and horizontal stabilizer, as well as environmental operating conditions such as outside air temperature and wind direction/velocity are measured by sensors onboard aircraft 11 and fed to an onboard aircraft air data computer 13. This data is subjected to intermediate processing in a conventional manner and then is sent in the form of error signals to a compensator 14 which in response to commands generated by the pilot at control column 16, generates control commands in the form of signals having high/low frequency, high/low amplitude components. The control signals are fed to a microprocessor based controller 15 which apportions these control signals in accordance with the present invention (i) to a conventional stabilizer positioning module 17 where stabilizer position command signals are generated and then fed to a stabilizer servo 18 which repositions stabilizer 10, and (ii) to an elevator servo 20 which repositions elevator 12.

Operation of controller 15 is described with reference to a block diagram shown in FIG. 3. Control signals (COMSIG) from compensator 14 are first processed in a manner that those incoming signals which do not exceed a limiting amplitude at amplitude limiter 30, are fed to a second order low pass Butterworth filter 32 which removes high frequency components of the control signal. The signals remaining at filter 32 are fed through a feedback subtractor 33 where elevator position error signals are generated.

These elevator position error signals are fed to a signal conversion block 34 where stabilizer rate (STAB RATE) signals are generated as a function of the elevator position error when (i) the elevator position error exceeds a predetermined level, and (ii) the elevator position error does not occupy a predetermined deadzone range where control of aircraft flight about the pitch axis is accomplished entirely by the elevator. The stabilizer rate signals correspond to a predetermined constant rate of movement of stabilizer 10 when it changes position. This rate of movement is a function of the speed of the horizontal stabilizer jack screw and related apparatus which deflect horizontal stabilizer 10.

Figure 4:
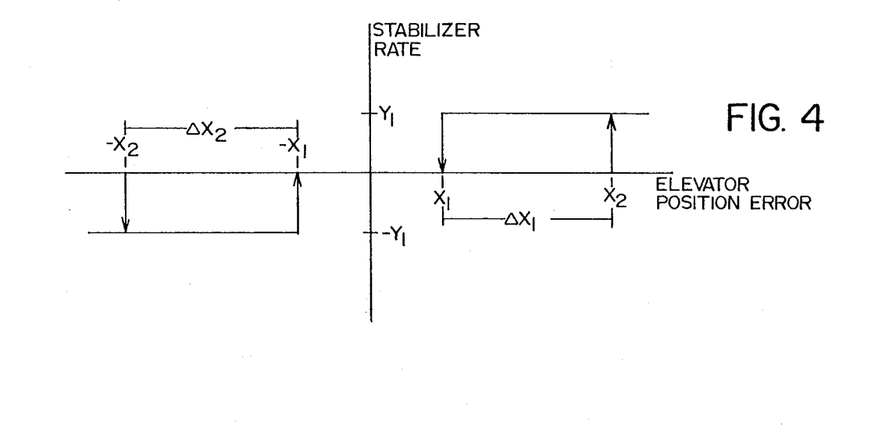
FIG. 4 is a graphical representation of stabilizer rate as a function of elevator position error in accordance with the present invention.

Operation of signal conversion block 34 may be discussed by referring to the graph at FIG. 4. In this graph, the y-axis represents the deflection rate of horizontal stabilizer 10 where deflection rates $y_1$, $-y_1$ correspond to predetermined constant deflection rates in the respective upward and downward directions. The x-axis represents elevator position error (ELPOS) where $x_1$, $x_2$ correspond to selected positive elevator position errors and $-x_1$, $-x_2$ correspond to selected negative elevator position errors. In accordance with the present invention, it is desirable that apportioning of control signals to the stabilizer 10 occur only after the elevator position error signal exceeds a predetermined level represented by the values $x_2, -x_2$, e.g. a value of ±10°. Thus, when the elevator position error signal ELPOS exceeds $x_2$ in a positive direction, or it exceeds $-x_2$ in a negative direction, the signal is off-loaded to the stabilizer 10 causing stabilizer 10 to reposition at a constant rate of either $y_1$ or $-y_1$, depending upon the sign of the elevator position error.

As stabilizer 10 is repositioned, for example, in the upward direction at rate $y_1$, the elevator position error signal is reduced, in a manner to be discussed hereinafter, until an elevator position error corresponding to $x_1$ is reached. At this point, the stabilizer rate is adjusted to zero and stabilizer movement is halted. All further pitch control commands are directed to the elevator 12 until elevator position error exceeds $x_2$, or $-x_2$, and apportioning of the control signals occurs as discussed previously. It is desirable that reduction of the elevator position error be limited to a small finite value other than zero. This is to prevent unwanted oscillatory deflections of elevator 12 relative to the reference plane of stabilizer 10 which might result if EPOS were adjusted to zero in order to terminate signal apportioning to the stabilizer.

In order to prevent frequent switching between an off-load condition and a non off-load condition when the elevator position error varies slightly about $x_2$ or $-x_2$, a predetermined amount of hysteresis $\Delta x_2, -\Delta x_2$ is provided wherein $\Delta x_2 = x_2 - x_1$ and $-\Delta x_2 = -x_2 - (-x_1)$. Thus, for example, once a STAB RATE signal is generated as the result of an elevator position error exceeding $x_2$, the STAB RATE signal continues to be generated as elevator position error decreases below $x_2$ until reaching $x_1$.

After leaving the signal conversion block (FIG. 3), a switch 38 determines whether the STAB RATE control signals are allowed to proceed to the stabilizer positioning module 17. For example, in certain instances such as when the aircraft flight conditions are changing, e.g., approaching a descent glideslope or during a landing flarepath, it is undesirable to apportion the incoming control signals to stabilizer 10. Therefore, only when required conditions are met, is switch 38 closed and the lower frequency control signals fed to stabilizer positioning module 17 where appropriate stabilizer commands DSTAB are generated by integration of the STAB RATE signal over time. The stabilizer command signals DSTAB are fed to stabilizer servo 18 (FIG. 1) to cause the horizontal stabilizer to deflect as a function of the received DSTAB command.

In order to generate an aircraft pitch attitude commanded by the pilot and/or by an automatic flight control system, an increase in the deflection of horizontal stabilizer 10 relative to the aircraft reference plane necessitates a corresponding reduction in the deflection of elevator 12 relative to the horizontal stabilizer reference plane. Thus, the generated DSTAB command is also fed to an elevator-to-horizontal stabilizer effectiveness ratio (EHSR) multiplier 44. The horizontal stabilizer has a much larger aerodynamic surface than the elevator, therefore when both airfoils are deflected equivalent amounts, the horizontal stabilizer will generate a larger pitch moment. The EHSR is a relationship determined from test data which defines the amount of elevator deflection and the amount of horizontal stabilizer deflection which are necessary to achieve equivalent pitch moments. The effectiveness ratio can be expressed in terms of the equivalent pitch effectiveness of the elevator per one degree deflection of the horizontal stabilizer. For example, depending upon aircraft type, it may require five degrees of deflection of the smaller elevator to achieve the same pitch moment as one degree of deflection of the larger horizontal stabilizer. Therefore at EHSR multiplier 44, the DSTAB signal is multiplied by the elevator-to-horizontal stabilizer effectiveness ratio to generate a product signal (EQEL) which represents the amount of equivalent elevator deflection which is provided by deflection of the horizontal stabilizer in responding to the DSTAB signal. In order to compensate for the pitch moment generated by deflection of horizontal stabilizer 10, the EQEL signal is fed to a subtractor 58 where it is subtracted from the compensator control signals (COMSIG) to generate an elevator control signal (ELSIG) which is then fed to elevator servo 20. At subtractor 58 the compensator signal (COMSIG) is reduced by an amount equal to the equivalent elevator deflection generated by the horizontal stabilizer after deflection in response to the DSTAB signal. This results in the generation of elevator control signal (ELSIG) and a corresponding reduction in deflection of elevator 12. As a result, controller 15 effectively apportions incoming control signals between the elevator and horizontal stabilizer.

In certain instances, the generation of an EQEL signal is undesirable. For example, when the aircraft is on the ground, and the pilot pretrims the horizontal stabilizer 10 to a takeoff trim setting, the change in horizontal stabilizer trim setting could cause the generation of a change in the EQEL signal resulting in unwanted movement of the elevator 12. Therefore, a switch 50 is incorporated between EHSR multiplier 44 and subtractor 58, so that when switch 50 is in the closed position, shown by dashes in FIG. 3, the generated signal (EQEL) is split off and fed both to a subtractor 54 as well as through a bypass loop 56. When the EQEL signal is fed to subtractor 54, the EQEL signal fed through loop 56 is subtracted from it, thereby cancelling the signal output. Thus, a change in horizontal stabilizer trim setting does not generate an EQEL signal. On the other hand, when switch 50 is in the open position, shown in solid lines in FIG. 3, a trim setting input at block 57 is fed to subtractor 54. This trim setting is a reference value which is subtracted from EQEL at subtractor 54 to generate a modified EQEL signal (EQEL') which is fed to a subtractor 58. By subtraction of the trim setting value, the EQEL' value fed to subtractor 58 reflects a change in position of the horizontal stabilizer from the trim set position.

After processing at subtractor 54, the signal EQEL' is split off and fed to feedback subtractor 33 where it is subtracted from the incoming FILSIG signal at a location downstream of filter 32 to generate the elevator position error signal. This error signal represents the difference between a commanded elevator position and an equivalent elevator position which is derived from the actual position of the horizontal stabilizer utilizing the calculated pitch effectiveness ratio.

As mentioned previously, the incoming signals are fed to filter 32 where those signals exceeding a predetermined amplitude are rejected by amplitude limiter 30. Since filter 32 typically has an inherent delay, it is sometimes desirable that the filter 32 be bypassed, particularly in the event of a low frequency, very high amplitude "emergency type" control input where the time between the generation of the emergency control signal and the actuation of the control airfoil caused by the inherent delay at filter 32 would be excessive. Therefore a portion of the signal outside the amplitude limits of limiter 30, is fed through a bypass loop 66 thereby bypassing filter 32 and generating a signal BYSIG which is fed to subtractor 33 where it proceeds in a manner as described previously. By avoiding the delay at filter 32 a portion of the large amplitude, low frequency signal exceeding the limits at amplitude limiter 30 is fed at a much faster rate to stabilizer position module 17 and to the stabilizer servo 18 to cause a rapid initial movement of the horizontal stabilizer 10. During this initial movement of the horizontal stabilizer 10 generated by BYSIG, the remaining portion of the signal is processed through filter 32, added to BYSIG, and fed to stabilizer position block 17 and then to the stabilizer servo 18 to continue deflection of the horizontal stabilizer in the commanded direction.

Figure 3:
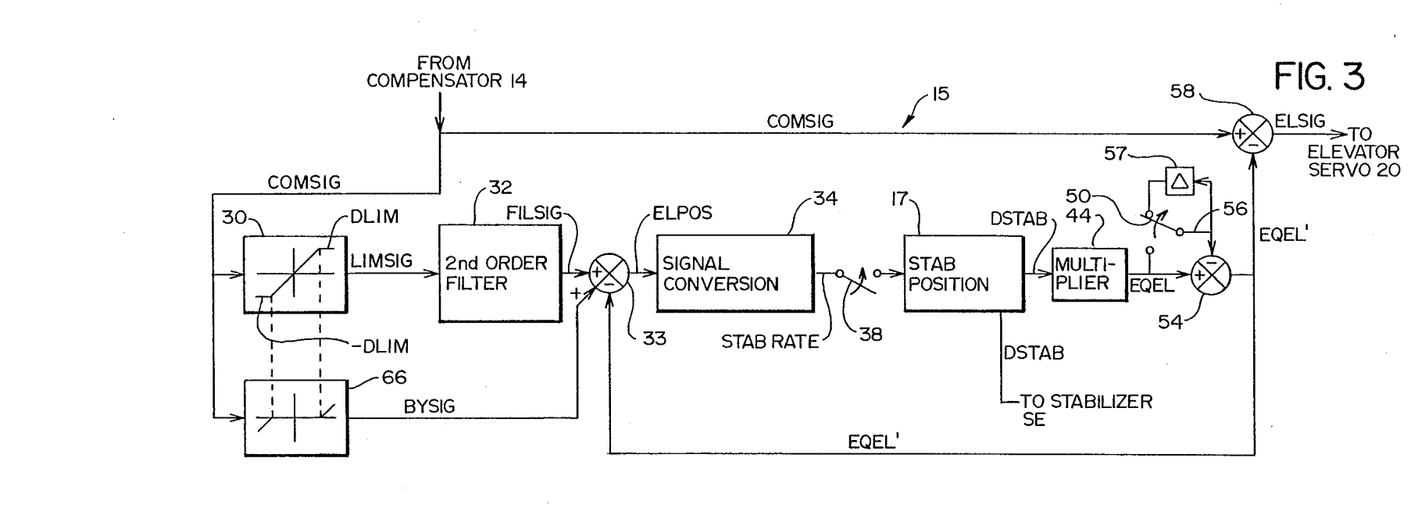
FIG. 3 is a block diagram of components comprising the signal apportioning controller.
Figure 5A:
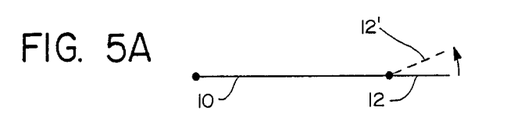
FIGS. 5A through 5C are simplified side views of the relative positions of the elevator and the horizontal stabilizer in response to (i) low frequency, low amplitude signals, (ii) high frequency, low amplitude signals, and (iii) low frequency, high amplitude signals which have been apportioned to the horizontal stabilizer.
Figure 5B:
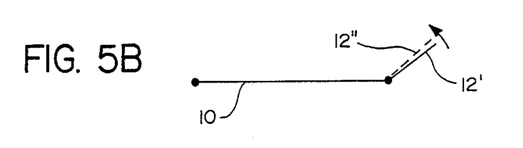
Figure 5C:
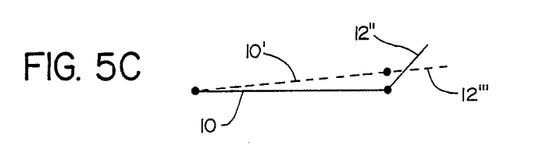

A better understanding of the operation of apportioning control 15 is provided by referring to FIG. 3 in conjunction with the previous example where high and low frequency, high/low amplitude commands are generated to decelerate the aircraft at a constant altitude. As may be recalled from the previous example, initially these commands are in the form of low frequency, low amplitude signals which are fed to apportioning controller 15. Since these signals do not exceed the elevator position error limits $\pm X_2$ (FIG. 4) at signal conversion block 34, a STAB RATE signal is not generated. Therefore the signal to the elevator servo 20 is unchanged and the pitch attitude of the aircraft is achieved entirely as a function of changing elevator position as shown in FIG. 5A, from a position shown by a solid line and designated 12 to a position shown by a dashed line and designated 12'. During deceleration, those high frequency, low amplitude signals generated in response to air turbulence are blocked at low pass filter 32. Therefore, change in aircraft pitch attitude in response to the turbulence is effected entirely by elevator movement as shown in FIG. 5B, from location 12', shown by a solid line, to location 12", shown by a dashed line. In order to continue aircraft deceleration however, lower frequency, higher amplitude signals are generated which increase elevator deflection until the elevator position error ($X_2$) is exceeded, whereby the STAB RATE signal is generated and fed to the stabilizer positioning module 17 (FIG. 3) to generate the DSTAB signal. The DSTAB signal is fed (1) to stabilizer servo 18 to cause a corresponding deflection of stabilizer 10, as shown in FIG. 5C, from location 10 shown by a solid line to location 10' shown by a dashed line, and (2) to multiplier 44 (FIG. 3) where the DSTAB signal is multiplied by the elevator-to-horizontal stabilizer pitch effectiveness ratio. The resulting product from multiplier 44 is subtracted from the COMSIG signal at subtractor 58, and the resulting difference signal ELSIG is fed to the elevator servo 20. A decrease in signal ELSIG causes a corresponding reduction in the deflection of elevator 12 relative to stabilizer 10 as shown in FIG. 5C from location 12" shown by a solid line, to a location 12''', shown by a dashed line. Thus, as the deflection of horizontal stabilizer 12 relative to the reference plane of aircraft 11 changes in response to the apportioned low frequency, high amplitude control signals, the deflection of elevator 12 relative to the reference plane of stabilizer 10 is changed by an offsetting amount so that the desired pitch attitude of the aircraft is achieved In the event a low frequency, very high amplitude command signal is generated, a portion of the command signal exceeding $\pm$DLIM bypasses filter 32 and an elevator position error is generated at feedback subtractor 33. When the level of the elevator position error signal at signal conversion block 34 also exceeds $X_2$ or $-X_2$, horizontal stabilizer 10 is deflected. In this manner, low or high frequency, very high amplitude signals are fed directly to stabilizer position module 17 to cause expeditious deflection of stabilizer 10.

Figure 6A:
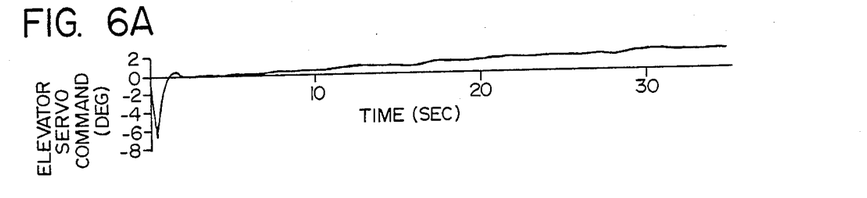
FIG. 6A is a graph of elevator servo command pitch change as a function of time.
Figure 6B:
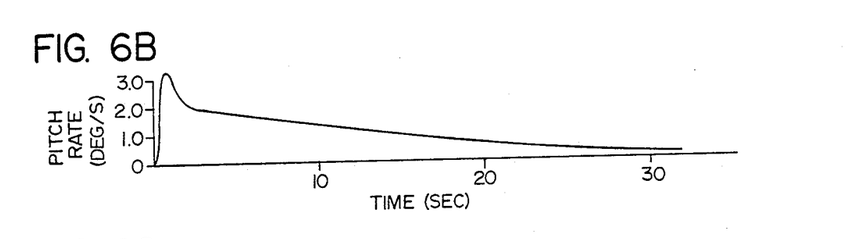
FIG. 6B is a graph of aircraft pitch rate as a function of time.
Figure 6C:
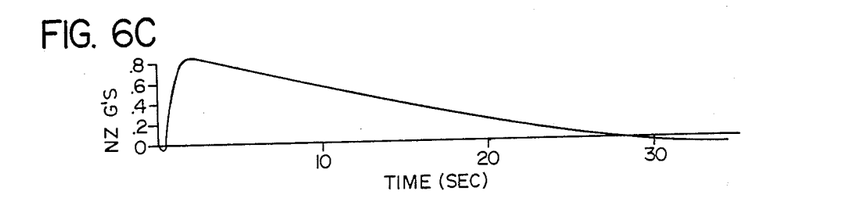
FIG. 6C is a graph of aircraft normal acceleration as a function of time.
Figure 7A:
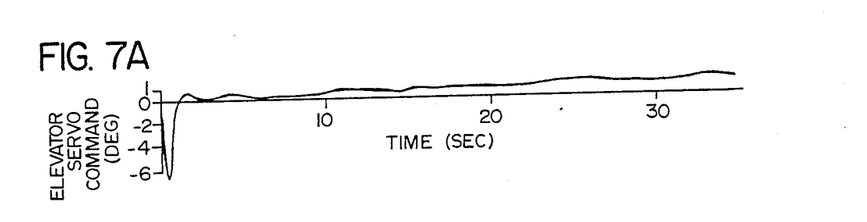
FIGS. 7A through 7D are graphical representations of elevator servo command, aircraft pitch rate, aircraft normal acceleration and horizontal stabilizer position, calculated as a function of time during a change in aircraft pitch, and incorporating the apportioning control of the present invention and using a predetermined nominal pitch effectiveness ratio.
Figure 7B:
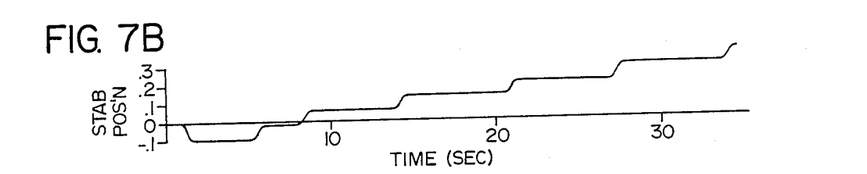
Figure 7C:
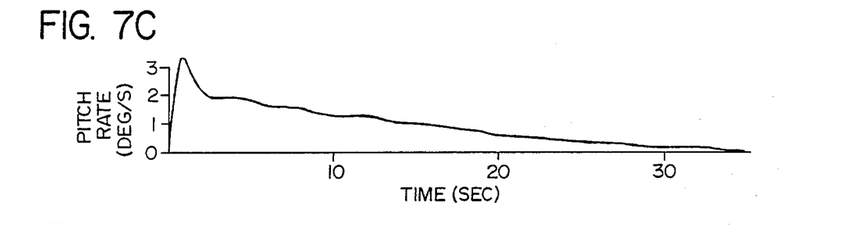
Figure 7D:
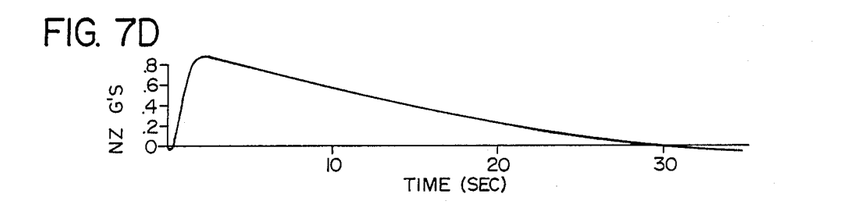
Figure 8A:
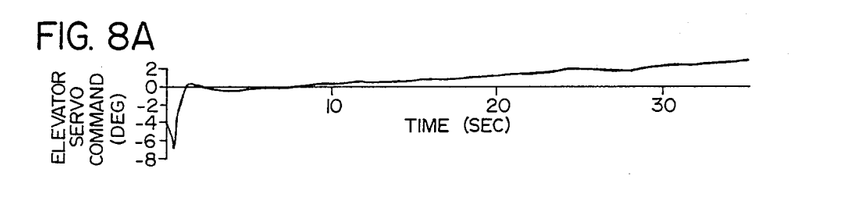
FIGS. 8A through 8D are graphical representations of changes in aircraft operating parameters, and incorporating the apportioning control of the present invention which uses a pitch effectiveness ratio of one half the nominal pitch effectiveness ratio used with reference to FIGS. 7A through 7D.
Figure 8B:
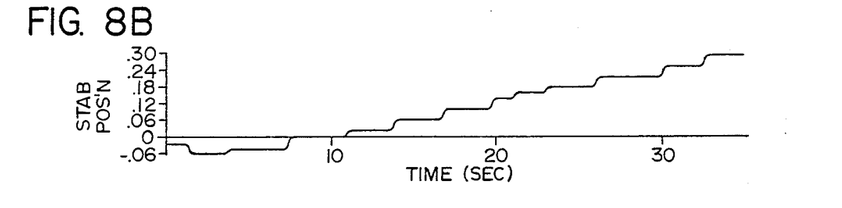
Figure 8C:
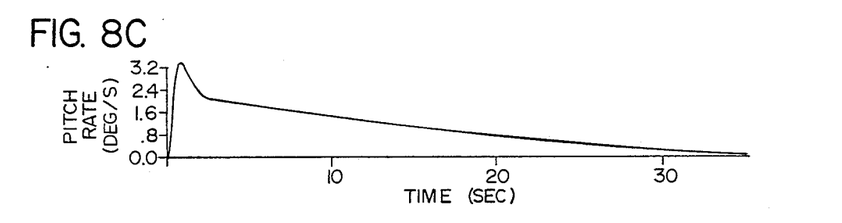
Figure 8D:
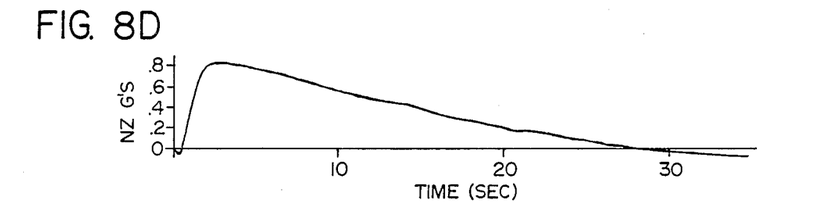
Figure 9A:
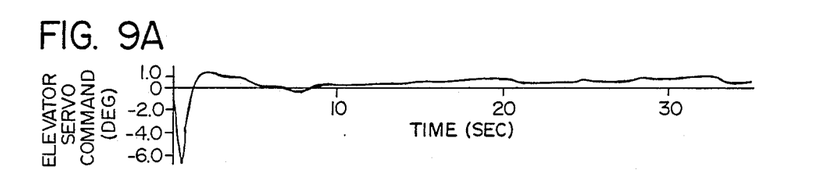
FIGS. 9A through 9D are graphical representations of changes in aircraft operating parameters, incorporating the apportioning control of the present invention which uses a pitch effectiveness ratio 1.9 times the nominal pitch effectiveness ratio used in FIGS. 7A through 7D.
Figure 9B:
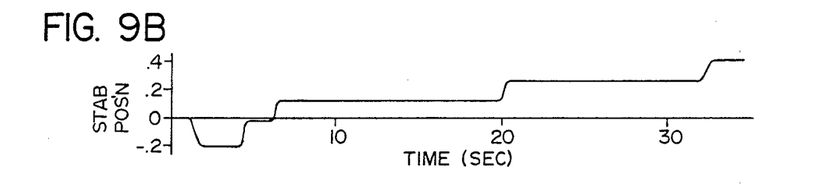
Figure 9C:
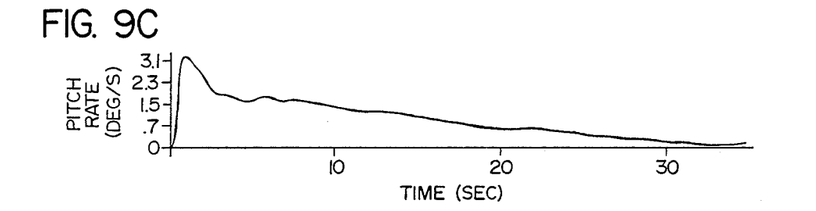
Figure 9D:
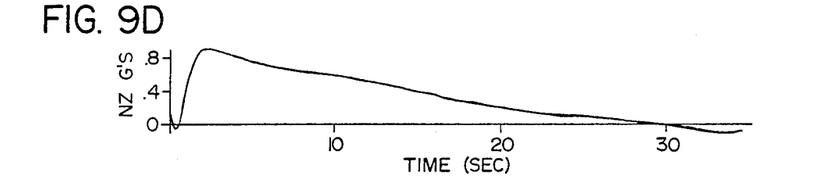
Figure 10A:
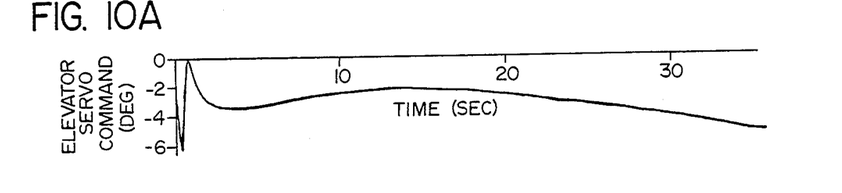
FIGS. 10A through 10D are graphical representations of changes in aircraft parameters incorporating the apportioning control of the present invention and using a pitch effectiveness ratio equal to that described with reference to FIGS. 7A through 7D, and under simulated conditions utilized with reference to FIG. 7A through 7D with the exception of aircraft center of gravity of 16% MAC.
Figure 10B:
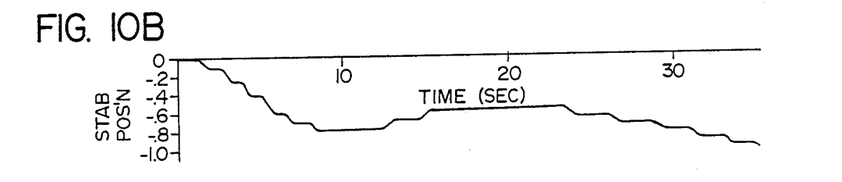
Figure 10C:
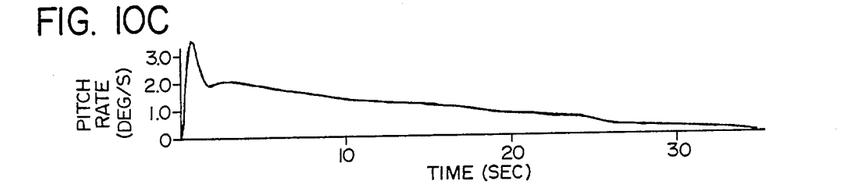
Figure 10D:
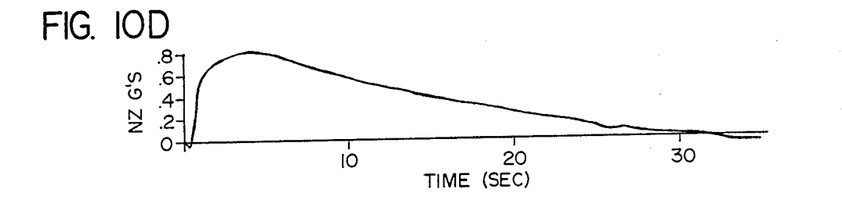

Generation of command signals to correctly reposition elevator 12 as a result of apportionment of the incoming control signals to horizontal stabilizer 10 is a function of the elevator-to-horizontal stabilizer effectiveness ratio (EHSR). The effectiveness ratio however, is affected by the location of the aircraft's center of gravity, aircraft gross weight and aircraft airspeed and altitude. Although a precise value of EHSR is difficult to determine, a ratio which approximates the actual pitch effectiveness ratio within an accuracy of plus or minus twenty percent is known from flight test data. In the present invention, however, effective apportioning of the control signals (COMSIG) is achieved even though the effectiveness ratio utilized in controller 15 varies from the calculated effectiveness ratio in a range extending between one half the calculated effectiveness ratio, and approaching a value twice the calculated pitch effectiveness ratio. The robustness of apportioning controller 15, i.e. the ability to achieve effective apportioning of the control signals while utilizing a wide range of values for the pitch effectiveness ratio, was determined in a series of tests performed utilizing a computer program. The resulting data was collected and presented in graphic form in FIGS. 6 through 10 wherein the output from elevator servo 20, (elevator servo command position), horizontal stabilizer position, aircraft pitch rate, and aircraft acceleration normal to the aircraft longitudinal axis, were plotted as a function of time. In one of these tests from which data was plotted in FIGS. 6A through 6C, a program was utilized simulating a flight control system of Boeing 757 aircraft without controller 15, and in which there was simulated an aircraft altitude of 35,000 feet, an airspeed of Mach 0.80, a gross weight of 184,000 pounds, a center of gravity of 48% MAC, and a 40 pound pull on the aircraft flight control column. For comparison, in FIGS. 7A through 7D, data from a simulated aircraft flight was plotted wherein controller 15 was incorporated utilizing a nominal pitch effectiveness ratio of approximately 2.6, and wherein all other flight parameters were as specified with reference to FIGS. 6A through 6D. It can be determined from a comparison of FIGS. 6 and 7, that while aircraft response typified by pitch rate and normal acceleration (LOAD FACTOR) were essentially equivalent, when controller 15 was incorporated the frequency and amplitude of deflection of the horizontal stabilizer increased, and the amplitude of the elevator servo command signal decreased, thereby indicating effective apportioning of control signals to the elevator and horizontal stabilizer. Similarly, where simulated flight conditions remained the same, yet the test pitch effectiveness ratio ranged between a value of 0.5 times nominal pitch effectiveness ratio (FIGS. 8A-8D) and 1.9 times nominal pitch effectiveness ratio (FIG. 9A-9D), pitch rate and normal acceleration did not vary significantly between tests, whereas stabilizer position and elevator servo command position varied significantly indicating effective apportioning of the control signals (COMSIG) was occurring between the horizontal stabilizer 10 and elevator 12 in spite of a large mismatch between calculated value and tested value of pitch effectiveness ratio.

In order to determine the effects of varying the aircraft center of gravity on controller 15, an aircraft flight of a Boeing 757 aircraft was simulated wherein the aircraft had a center of gravity of 16% MAC, an altitude of 35,000 feet, airspeed of Mach 0.80, gross weight of 184,000 pounds and a 40 pound column pull. Data generated from the simulated flight in which controller 15 was incorporated was shown in FIG. 10. Although stabilizer position and elevator servo command values varied significantly from those shown in FIGS. 6 through 9, the aircraft pitch rate and normal acceleration showed only minor variations indicating the effectiveness of controller 15 in apportioning the incoming COMSIG signals in spite of a significant change in aircraft center of gravity.

What is claimed is:

1. An aircraft having first and second movable flight control members and a controller for so operating said flight control members as to cause said aircraft to follow a selected flight path, said controller comprising:
   (a) means for receiving at least a first input signal derived from a flight operating parameter or an environmental operating condition which is capable of affecting the flight path of the aircraft;
   (b) first means for processing said first input signal and thereby generating a first output for moving said second flight control member a first amount to a first position relative to a first reference position, coincidentally generating a first aerodynamic force;
   (c) means for generating a second output indicative of a second amount of movement of said first flight control member to a second position relative to a second reference position in which said first flight control member is capable of coincidentally generating a second aerodynamic force substantially equivalent to said first aerodynamic force;
   (d) second means for processing said second output and said first input signal into a third output for moving said first flight control member a third amount, relative to said second reference position, which is less than said second amount of movement by an amount which is equivalent to said second output, in order to move said first flight control to a third position;
   (e) said first output and said third output thereby so causing the second and first flight control members to be positioned at said first and third positions as to cause the aircraft to fly said selected path.

2. The controller as set forth in claim 1 wherein:
   (a) said first and second flight control members operate in a manner to generate respective moments of force about a pitch axis of the aircraft;
   (b) said first aerodynamic force is a first pitch moment; and
   (c) said second aerodynamic force is a second pitch moment.

3. The controller as set forth in claim 2 wherein said second processing means includes means for subtracting said second output from said first input signal to generate said third output.

4. The controller as set forth in claim 3 wherein:
   (a) the first input signal includes a high frequency portion and a low frequency portion;
   (b) said first processing means includes frequency discrimination means for separating said higher frequency portion from said lower frequency portion, and for feeding said lower frequency portion to said first output to generate a feedback signal to the first output.

5. The controller as set forth in claim 4 wherein:
   (a) said frequency discrimination means comprises a low pass filter having a discrete delay period between a time when said first input signal is fed to said filter and a time when said lower frequency portion departs said filter; and
   (b) said first processing means including means for directing a portion of said first input signal which is in excess of a predetermined amplitude along a path which bypasses said filter to initiate movement of said second flight control member and to avoid said filter delay.

6. The controller as set forth in claim 1 wherein said controller also includes means for receiving a second input signal which is derived from a flight operating parameter, or an environmental operating condition which is capable of affecting the flight path of the aircraft and means of so processing said second input signal as to provide a further output for moving said first flight control member an amount relative to said second reference position which is less than said first amount.

7. The controller as set forth in claim 6 wherein:
   (a) said second flight control member is movable relative to said first reference position at a predetermined rate; and
   (b) said first processing means includes:
      (1) first means for detecting when said input signals exceed a first predetermined threshold and for initiating a fourth output of said first input signal when said first threshold is exceeded;
      (2) means for terminating said fourth output when the first threshold is no longer exceeded by said input signals;
      (3) means, responsive to said fourth output, for generating a rate signal which is representative of said predetermined rate of movement of said second flight control member; and
      (4) means for integrating said rate signal during the time when said input signals exceed said first threshold to generate said first output.

8. The controller as set forth in claim 1 wherein:
   a. said first and second flight control members operate in a manner to generate respective moments of force about a pitch axis of the aircraft;
   b. said first aerodynamic force is a first pitch moment; and
   c. said second aerodynamic force is a second pitch moment.

9. The controller as set forth in claim 8 wherein:
   (a) said first control surface is a movable horizontal stabilizer: and
   (b) said second control surface is an elevator which is connected to said horizontal stabilizer.

10. A control system for an aircraft comprising:
    (a) a horizontal stabilizer for regulating the flight path of said aircraft in response to a deflection of said horizontal stabilizer;
    (b) an elevator for regulating the flight path of said aircraft in response to a deflection of said elevator;
    (c) means for receiving an input signal which includes a high level component and is derived from a flight operating parameter or an environmental operating condition which is capable of affecting the flight path of the aircraft by deflecting said elevator in a manner that causes the aircraft to fly a first selected path;

(d) means for processing said high level component to generate a first output to impart to said horizontal stabilizer a third amount of deflection relative to a reference plane of said aircraft so as to generate a first pitch moment; and (e) computer means including:
  (1) means for calculating an amount of deflection of said elevator relative to a reference plane of said horizontal stabilizer which will generate a second pitch moment substantially equivalent to said first pitch moment and for generating a second output indicative of said calculated amount, and
  (2) means for subtracting said second output from said high level component to generate a third output for deflecting said elevator a fourth amount relative to said horizontal stabilizer reference plane which is less than said second amount by an amount which is equivalent to said calculated amount so that the aircraft is caused to fly said first selected path.

11. A method for controlling movement of an aircraft having first and second flight control members and a controller for so operating said flight control members as to cause said aircraft to follow a selected flight path, the method comprising the steps of:
  (a) receiving at least a first input signal derived from a flight operating parameter or an environmental operating condition which is capable of affecting the flight path of the aircraft;
  (b) so processing the first input signal as to generate a first output which will impart to the second flight control member a first amount of deflection relative to a first reference plane which generates a first aircraft pitch moment about the pitch axis;
  (c) calculating a second amount of deflection of the first flight control member relative to a second reference plane which will generate a second aircraft pitch moment about the pitch axis which is substantially equivalent to the first pitch moment;
  (d) generating a second output indicative of the calculated second amount of deflection; and
  (e) combining the second output and the first input signal into a third output for deflecting the first flight control member a third amount, relative to the second reference plane, which is less than the second amount of deflection by an amount which is equivalent to the second calculated amount; and
  (f) so positioning the first and second flight control members in accordance with the third and first outputs as to cause the aircraft to fly the first selected path.

12. The method as set forth in claim 11 wherein the third output is generated by subtracting the second output from the first input signal.

13. The method as set forth in claim 12 wherein said controller also includes means for receiving a second input signal which is derived from a flight operating parameter or an environmental operating condition which is capable of affecting the flight path of the aircraft and wherein said method further comprises the steps of:
  (a) so processing the second input signal in the controller as to provide a further output for moving the first flight control member in accordance with the further output an amount relative to the second reference position which is less than the first amount.

14. The method as set forth in claim 13 wherein processing the first signal includes the steps of:
  (a) detecting when the input signals exceed a first predetermined threshold, and initiating a fourth output of the first input signal when the first threshold has been exceeded;
  (b) terminating the fourth output when the first threshold is no longer exceeded by the input signals;
  (c) generating a rate signal, in response to the fourth output, which is representative of the predetermined rate of movement of the second flight control member; and
  (d) so integrating the rate signal when the input signals exceed the first threshold as to generate the first output.

15. The method as set forth in claim 11 additionally comprising the step of separating a higher frequency portion of the first input signal from a lower frequency portion of the first input signal and feeding the lower frequency portion to the first output for generating a feedback signal to the first output.

16. The method as set forth in claim 15 further comprising the step of:
  (g) operating the first and second flight control members in a manner which so generates respective moments of force about a pitch axis of the aircraft that the second flight control member generates a greater pitch moment than the first flight control member when the second and first flight control members are moved equal amounts relative to the respective first and second reference planes.

* * * * *